United States Patent Office 2,937,153
Patented May 17, 1960

2,937,153

NITROCELLULOSE/ALKYD/MELAMINE-ALDEHYDE COATING COMPOSITION

Paul L. Rasmussen and Russell L. Sears, Detroit, Mich., assignors to The Sherwin-Williams Company, Cleveland, Ohio, a corporation of Ohio No Drawing. Application March 10, 1958
Serial No. 720,081

4 Claims. (Cl. 260—15)

This invention relates, as indicated, to a new and improved automotive coating composition and more particularly to an improved binder for automotive coating compositions, especially those of the metallic type.

The prior art now has available four principal types of automotive vehicle coatings, two of which are of the air-drying type and two of which are of the baking type.

The conventional lacquer is of the air-drying type and is usually composed of from 30% to 50% nitrocellulose, 5% to 10% plasticizer, and the balance of the vehicle solids being a non-drying alkyd such as, for example, a coconut oil modified glyceryl phthalate alkyd. The plasticizers are usually dibutyl phthalate, tricresyl phosphate, with or without some added castor oil. When it is attempted to formulate these lacquers with aluminum, particularly in the light shades, early failure is experienced on exterior exposure as rapid loss of gloss.

In order to improve the gloss retention in what are known as the light colored metallics, new compositions based on polymethyl methacrylate were devised and were generally of a composition in which the vehicle solids were composed of from 55-70% polymethylmethacrylate, 25-30% plasticizer, such as butyl benzyl phthalate, and from 0-15% nitrocellulose. These compositions did give improved gloss retention but they possess all the drawbacks of lacquers, namely, the necessity for spraying it at from 24-34% solids necessitating multiple coats. Also it is necessary to rub and polish to obtain gloss and the coating is always soluble during its life.

An alternate approach to the coating of vehicle body metallic surfaces has been along the line of baking enamels. The regular automotive enamel has been formulated having a composition of the vehicle solids roughly in the range of 80-90% of a soya or safflower modified alkyd resin (glyceryl phthalate) of from 40-45% oil length and from 10-20% of a melamine and/or urea formaldehyde resin, usually of the alkylated, e.g., butylated, type. In order to get better gloss retention on weathering, automotive enamel manufacturers improved upon the regular enamel formula replacing the soya or safflower alkyd with from 70-75% of a non-drying oil alkyd of the coconut, pelargonic or cottonseed, type modification in an alkyd containing 45-50% phthalic anhydride as phthalic esterified with glycerine. The balance of the vehicle solids in these enamels was 25-30% of a melamine and/or urea formaldehyde type. Gloss retention was improved with the regularly pigmented enamels, but there was not sufficient improvement in gloss retention with the metallics. One of the principal problems with the baking metallic enamels has been their inability to be restored to higher gloss by polishing. The loss of gloss in metallics is actually a dulling believed to be caused by the protrusion from the film of the aluminum metallic particles as the binder is eroded by weathering which so distorts the surface as to render it flat in appearance. No amount of polishing will restore the gloss. The acrylics are generally more costly than the baking type enamels and in order to get an adequate film "build," generally three coats must be applied. These coatings must also be polished and baking will not render them thermoset.

The enamels are not satisfactory for the light metallics because of a bad tendency toward flooding and not entirely satisfactory in durability. The enamels must be baked. However, two coats can be applied and no polishing is necessary to develop the maximum gloss.

We have now discovered a new, enamel-type baking formulation for a vehicle which is primarily adapted and useful in the formulation of metallic automotive enamels and particularly the light colored metallic automotive coatings. These vehicles are also advantageously used with the regular solid color pigmentation normally employed by the prior art. They may also be advantageously employed as clear enamels. The principal novelty in this improvement is in the vehicle solids. The usual rules and procedures employed by the art as of this time for formulating and improving enamels is applicable with the improved vehicles of the present invention. In other words, pigmentation techniques in the manufacture of both metallics and solid color enamels, the grinding procedures, etc., are all substantially the same, the principal difference in the mechanical handling of such automotive coating compositions being the substitution of the new vehicle for those presently in use.

It is a principal object of this invention, therefore, to provide an improved clear or pigmented baking enamel vehicle especially adapted for application to primed metal surfaces.

Another object of this invention is to provide a new and improved vehicle for use in the production of clear or pigmented automotive baking enamels which is characterized by its improved initial gloss and its ability to retain gloss on weathering.

Another object of this invention is to provide an improved vehicle for clear or pigmented automotive enamel formulations which gives improved gloss retention and durability on weathering in light pastel metallic automotive finishes.

Another object of this invention is to provide a vehicle for formulation in a clear or pigmented baking enamel which provides a very materially improved rate of hardening such that metallic parts coated with this composition emerging from the baking oven can be handled at a much earlier time with less handling damage than heretofore possible with the enamels available.

Still another object of this invention is to provide a baking enamel vehicle for clear or pigmented coatings which develops a hardness at a low bake temperature (e.g., in the range of from 170° F.–200° F.) and gloss compatible with the hardness and gloss of the same coating composition previously baked at a higher temperature, e.g., 250° F.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, therefore, this invention comprises the provision of a new and improved vehicle for use in clear or pigmented baking enamels which comprises a homogeneous solution of from 3–10 parts of nitrocellulose, the balance being a total of 100 parts composed of a mixture of from 20%–35% of (a) an aminotriazine-aldehyde condensation product, and (b) 65%–80% of a non-drying oil or non-drying oil fatty acid modified alkyd resin or mixture of such alkyds in which the dibasic acid is a phthalic acid and the polyhydric alcohol in an aliphatic polyol containing at least 2 hydroxyl groups. The foregoing basic composition as distinguished from a fully formulated coating composition may also be characterized by the presence therein of many other ingredients.

Particularly advantageous results are secured, for example, by the inclusion therein of from 2–8 parts of $Fe_4(P_2O_7)_3 \cdot 9H_2O$, hydrated ferric pyrophosphate. Plasticizers are frequently desirably included, examples of which are dioctyl phthalate, butyl benzyl phthalate, dibutyl phthalate, tricresyl phosphate, etc., all of which are well known to enamel formulators. Another ingredient which is desirably, although not essentially contained in the basic compositions is a non-drying oily or greasy aliphatic material in amounts ranging from 0–3 parts. A particularly suitable example is petroleum jelly. Other greasy materials which may be included in the aforesaid minor amount include mineral oil, petroleum waxes, natural waxes, e.g., beeswax, paraffin wax, etc.

The compositions of this invention when formulated with metallic pigments, e.g., powdered aluminum, appear to provide better metallic appearance than the metallic compositions of the prior art, give less showing of sand scratches, yield better "bridging" and less evidence of undercoat defects.

The three essential ingredients alone or together with the several ingredients above mentioned combine to form the novel vehicles of this invention. By the term "vehicle" as used herein, we have reference to the non-volatile portion of the binder. The vehicle as such contains no pigment. When the vehicle is diluted with solvents, and suitable colorants are dispersed and/or dissolved therein, if desired, there is obtained what will be referred to in this specification as a baking enamel.

While the usual solvents and diluents may be used in conjunction with the compositions of this invention, best results are secured with a "high-low" solvent-diluent of the type more particularly described and which has specific utility for the coating compositions, the enamels and vehicles of the present invention. Such solvents are used to reduce the enamel to proper handling viscosity for packaging, for example, 50% total solids and for further reduction to suitable spraying viscosity, i.e., 15 to 25 seconds #4 Ford cup.

It becomes convenient at this point, therefore, to provide specific examples of basic vehicles compounded in accordance wtih the principles of the present invention, it being understood that these examples are for illustrative purposes only to provide a guide to those skilled in the art for the formulation of numerous other examples within the ranges stated above which will become readily apparent upon a review of these examples. These "basic vehicles" may be diluted with solvents to provide "clears," or unpigmented coatings for primed metal surfaces or already coated surfaces for added protection. Such dilution can be made with any suitable solvent or the special reducer-thinner hereinafter defined to a consistency sufficient for spray application, i.e., 20% to 40% solids. These basic vehicles may also be pigmented with the usual type of enamel pigmentation commonly employed in the art. Particularly desirable results are obtained with metallic pigmentation, especially in the light color metallics field.

VEHICLE EXAMPLE 1

| | Lbs. |
|---|---|
| Nitrocellulose, ½ second (30% solids) | 45 |
| Coconut oil modified glyceryl phthalate (28% oil) (60% solids in 50–50 xylene-high flash naphtha) | 300 |
| Butylated melamine-formaldehyde resin (60% solids in 50–50 butyl alcohol-xylol solution) | 105 |

A typical nitrocellulose solution and that which was used in this example is a 30% solution having the following composition:

| | Lbs. |
|---|---|
| Nitrocellulose (alcohol wet—71% solids) | 420 |
| Isobutyl acetate | 100 |
| Methylisobutyl ketone | 100 |
| Ethyl alcohol (anhydrous) | 93 |
| Light lacquer diluent naphtha | 39 |
| Toluol (or equivalent) | 203 |
| Xylene | 45 |

The coconut oil modified alkyd above referred to as a 60% solids solution, is produced in accordance with the following formula:

Under an inert gas blanket, 147 lbs. of coconut oil and 117 lbs. of glycerine are heated to 450° F. This requires about 1 hour. Thereafter, .4 lb. of lead naphthenate (24% solution) are added, and the batch held until clear. After 50 minutes, 241 lbs. of phthalic anhydride and 30.4 lbs. of tertiary butyl benzoic acid are added. After the addition of the phthalic anhydride, 30.8 lbs. of propylene glycol are added and the mixture prepared for a solvent cook.

23 lbs. of xylene are added and the mixture heated to reflux. The reaction is cooked at reflux until an acid value of 5.5 is obtained and a viscosity of Z. The cooking time was 10 hours and the temperature ranged from 350° to 420° F. over this period. Approximately 3.9 gals. of water were removed from the still. The cooked material was then dropped and diluted to 60% solids in a 50–50 mixture of xylene and high flash naphtha.

Those skilled in the art are fully aware of the methods of preparing non-drying oil or non-drying acid modified polyolphthalate resins, any of which can be used in the basic vehicles of this invention.

With respect to the aminotriazine-aldehyde resin, alkylated melamine-aldehyde, or alkylated benzoguanamine-aldehyde resins at about 50%–60% solids concentration in xylol or a combination of a low molecular weight aliphatic alcohol and xylol and/or toluol are commercially available on the market and specific instructions for the preparation of such resins will be found in Pat. 2,259,980. Reference may also be had to U.S. Patents Nos. 2,197,357 and 2,260,239, which disclose useful amino triazine resins and their preparation.

In the foregoing Example 1, any other non-drying oil or non-drying oil acid modified alkyd resins may be used in place of the coconut oil alkyd. For example, a cottonseed oil alkyd may be used to replace part or all of the coconut oil alkyd therein described. Pelargonic acid modified glyceryl phthalate alkyds may also be used. Although the dibasic acid component of the alkyds should be aromatic in the compositions of this invention, any phthalic material as the acid or anhydride may be used such as, for example, phthalic anhydride, isophthalic acid or terephthalic acid. The polyhydric alcohol used in making the alkyds is aliphatic and contains at least 2 hydroxyl groups, specific examples thereof being various glycols, e.g., propylene glycol, butylene glycol, ethylene glycol, diethylene glycol, etc., glycerine, pentaerythritol, trimethylolethane, trimethylolpropane, polypentaerythritol, sorbitol, etc.

As to the modifying component, any non-drying oil fatty acid or any non-drying oil may be used. Also useful in modifying the alkyds of this invention are the saturated and mono unsaturated fatty acids containing from 8 to 20 carbon atoms including pelargonic, stearic, oleic, lauric, caproic, 2-ethyl hexoic, etc. The modifier portion in these compositions is generally low, i.e., the alkyds are "short," containing from about 15–32% by weight non-drying fatty oil or acid modification.

The following are specific examples of non-drying oil and non-drying fatty acids containing from 8 to about 20 carbon atoms modified aliphatic polyol phthalates which may be used in the compositions of this invention in the manner illustrated in the specific examples hereof.

Cottonseed modified pentaerythritol phthalate (24% oil by weight)
Coconut oil modified glyceryl phthalate (19% oil by weight)
Oliver oil modified trimethylolethane ortho-phthalate (15% oil by weight)
Corn oil modified trimethylolethane terephthalate (30% oil by weight)
Oleic acid glyceryl-trimethylolethane phthalate (18% oleic by weight)
Pelargonic acid trimethylolethane isophthalate (22% acid by weight)
Stearic acid sorbitol phthalate (28% stearic by weight)
Lauric acid modified trimethylolethane phthalate (20% lauric by weight)
2-ethyl hexoic acid modified trimethylol propane terephthalate (15% acid by weight)
2-ethyl hexoic acid modified glyceryl phthalate (31% acid by weight)
Coconut oil modified trimethylol propane ortho-phthalate (23% oil by weight)
Cottonseed modified trimethylolethane ortho-phthalate (3% benzoic acid chain stopper —25% oil by weight)
Castor oil modified glyceryl phthalate (25% oil by weight)

Although the procedure for producing the non-drying modified phthalate alkyds useful in accordance herewith may be substantially as given above, those skilled in the art are fully familiar with this and other methods of producing various useful modified alkyd resins.

Nitrocellulose solutions are staple articles of commerce well known to those skilled in the art.

VEHICLE EXAMPLE 2

| | Parts |
|---|---|
| Nitrocellulose (⅜″) (used as a 30% solution) | 5 |
| Dioctyl phthalate | 5 |
| Petroleum jelly (used as a 10% solution in xylol) | 2 |
| Ferric pyrophosphate nonahydrate | 5 |
| Butylated melamine-formaldehyde ("Resimene" 881) (used as a 60% solution in 1:1 butanol-xylol) | 23.2 |
| Coconut oil modified glyceryl phthalate (used as a 60% solution in naphtha-xylene 1:1) | 59.8 |

(All parts by weight and calculated as 100% solids.)

The foregoing vehicle can be admixed with suitable reducer, later to be described, and ground with pigments to produce an improved enamel. The formula for a metallic color is 94–97% non-volatile vehicle (Example 2 vehicle), 3–6% pigment including non-leafing aluminum pigment.

If the vehicle is to be formulated into a solid, or non-metallic, color, the composition can run from 3–50% pigment and from 50% to 97% non-volatile vehicle.

As indicated above, a particularly effective reducer or thinner for the vehicles of this composition is rather specific and unique. It is composed of a major amount of a mixture of low molecular weight aliphatic ketones boiling in the range of from about 30° C. to 160° C. The second principal type of component is an aliphatic alcohol or mixture of aliphatic alcohols containing from 2–8 carbon atoms. The third type of ingredient in this reducer is an aromatic hydrocarbon diluent or mixture of aromatic hydrocarbon diluents, e.g., benzene, xylene, toluene, ethyl benzene, cumene-acetylene mixture, etc. A specific example of a preferred reducer thinner for adjusting viscosity for packaging or for further reducing the composition or spray application is as follows:

| | Lbs. |
|---|---|
| Acetone | 42.5 |
| Methyl ethyl ketone | 176.5 |
| Ethyl amyl ketone | 106 |
| Iso-octyl alcohol | 35 |
| Ethyl alcohol | 40 |
| Xylol | 106 |
| Toluol | 200 |

This is an ester-free "high-low" enamel solvent or reducer, although minor percentages up to 5% by weight of ester may be present.

VEHICLE EXAMPLE 3

| | Lbs. |
|---|---|
| Coconut oil modified alkyd (above described) | 201 |
| Cottonseed oil modified trimethylolethane phthalate (24% oil by weight; 55% solids in xylene-methyl isobutyl ketone—6:1) | 147 |
| Butylated melamine-formaldehyde (60% solids in butanol-xylol solution—1:1) | 119 |
| Dioctyl phthalate | 10.5 |
| ⅜″ nitrocellulose solution (30% solution) | 50 |
| | 527.5 |

VEHICLE EXAMPLE 4

This example illustrates the use of a non-drying acid modified alkyd resin in a vehicle of this invention.

| | Lbs. |
|---|---|
| Oleic acid modified glyceryl ortho-phthalate (55% solids in xylene) | 100 |
| Butylated benzoguanamine-formaldehyde resin (60% in xylene-butanol—1:1) | 35 |
| ½″ nitrocellulose solution (30% solution) | 11.5 |
| Ferric pyrophosphate nonahydrate | 4 |
| Dibutyl phthalate | 4 |

VEHICLE EXAMPLE 5

| | Lbs. |
|---|---|
| Cottonseed oil modified trimethylolethane phthalate (24% oil by weight; 55% solids in xylene-methyl isobutyl ketone—6:1) | 100 |
| Butylated melamine-formaldehyde resin (60% solids in butanol-xylol—1:1) | 38 |
| ½″ nitrocellulose solution (30% solids) | 13 |

VEHICLE EXAMPLE 6

| | Lbs. |
|---|---|
| Coconut oil modified glyceryl phthalate (60% solids in xylene-high flash naphtha 1:1) | 179 |
| Cottonseed trimethylolethane phthalate (24% oil by weight, 55% solids in xylene-methyl isobutyl ketone—6:1) | 131 |
| Butylated melamine-formaldehyde resin (60% solids in butanol-xylene—1:1) | 105 |
| Methyl isobutyl ketone | 65 |
| Ethyl amyl ketone | 16 |
| Methyl ethyl ketone | 15 |
| Dioctyl phthalate | 12 |
| ½″ nitrocellulose solution (30% solids) | 45 |
| Petroleum jelly in xylene (10% solids) | 51.5 |

In order to illustrate the utility of the basic vehicles of this invention, and solely for this purpose, the following is an example of a fully formulated baking enamel having a green metallic color. This composition when diluted to normal spray consistency and applied in two coats over a primed surface yields a high gloss, mar resistant, early hardness coating.

EXAMPLE 7

| | Lbs. |
|---|---|
| Vehicle of Example 6 | 616.5 |
| Inert base (see formula below) | 51.5 |
| Phthalocyanine green pigment color (see formula below) | 142 |
| Non-leafing powdered aluminum-resin mixture—40–60 | 13.75 |
| Carbon black pigment | .2 |

The foregoing composition had a viscosity of 40–50 seconds on a #4 Ford cup at 80° F. The recommended reduction is 33% with a solvent-reducer of the type completely described above.

This coating composition was applied in two coats by spray application on a surface which was prepared by coating with a conventional primer-surfacer commonly employed in the automotive art. The coating was baked for 30 minutes at 250° F. to yield a high gloss tough coating. Gloss was retained at a very high level after 12 months exposure in Florida, 45° south.

Another powdered aluminum paste commonly employed has the following composition:

| Aluminum paste | Parts |
|---|---|
| Aluminum powder (non-leafing) | 66 |
| V.M. & P. naphtha | 33 |
| Stearic acid | 1 |

EXAMPLE 8

This is another example of a metallic green automotive enamel of this invention.

| | Lbs. |
|---|---|
| Vehicle of Example 6 | 600 |
| Inert base (see formula below) | 50 |
| Phthalocyanine green (see below) | 140 |
| Aluminum paste (above) | 8.4 |
| Carbon black pigment | 0.15 |

This composition had approximately the same characteristics as Example 7 above and is reduced with the solvent-reducer above described 33% for spray application to a primed metal surface.

The inert base in the foregoing Examples 7 and 8 is produced in accordance with the following formula:

| | Lbs. |
|---|---|
| Ferric pyrophosphate ($Fe_4(P_2O_7)_3 \cdot 9H_2O$) | 239 |
| Butylated melamine-formaldehyde resin (60% solids in 50–50 butanol xylol) | 72 |
| Cottonseed modified trimethylolethane phthalate (24% oil by weight) | 110 |
| Methyl isobutyl ketone | 62 |
| Cellosolve acetate | 62 |
| Nitrocellulose solution (30% solids—above described) | 57 |
| Toluol | 57 |
| Xylol | 57 |
| Lacquer thinner | 191 |

A suitable lacquer thinner, as used in the above inert base, has the following composition:

| | Parts by weight |
|---|---|
| Methyl isobutyl ketone | 27 |
| Butyl alcohol | 13 |
| Ethyl alcohol | 5 |
| Toluene | 55 |

In the foregoing Examples 7 and 8, the phthalocyanine green pigment composition is produced by ball milling for 60 hours to a 7H grind the following components in the indicated amounts:

| | Lbs. |
|---|---|
| Phthalocyanine green (dry) | 206 |
| Soya bean oil modified glyceryl phthalate (15% oil by weight) (50% solids) | 660 |
| Zinc naphthenate solution (8% zinc) | 10 |
| Guaicol solution (15%) | 31 |
| Mineral spirits | 124 |

Other examples of fully formulated baking enamels may be formulated using the pigmentation practices currently employed in the art with the basic vehicles of this invention as will be understood by those skilled in the art.

For most purposes, the metallic baking enamel vehicles of this invention have the following general composition:

| | Percent |
|---|---|
| $Fe_4(P_2O_7)_3 \cdot 9H_2O$ | 2–8 |
| Nitrocellulose (¼ second, ⅜ second, ½ second, 5–6 c.p.s.) | 3–7 |
| Plasticizer | 0–10 |
| Non-drying aliphatic petroleum derivative having a boiling point in excess of 150° C. e.g., an oil, grease or wax | 0–3 |
| Aminotriazine-aldehyde resin | 20–35 |
| Non-drying polyol phthalate resin | 43–75 |

Another aspect of these coating compositions which is of extreme importance in assembly line production is the hardness (Sward hardness) of the film as it emerges from the baking oven. Automotive manufacturers utilizing regular prior art enamels in the initial application baking for 30 minutes at 250° F. ordinarily get a Sward hardness of 22. They would like to be able to obtain a hardness of 30. On touch-up after assembly, the temperature of the bake is limited to about 180° F. because of the presence of materials in the assembly, e.g., upholstery which would be damaged by higher temperatures. The touch-up bake is conducted at 180° F. and at this lower temperature, the Sward hardness obtained using the same enamel is only 3. The manufacturers would like to have a hardness for touch-up of at least 16.

The regular enamels commonly used today contain oxidizing oils and as the coating ages, the Sward hardness increases and therefore chipping and stone damage is a very serious problem with such enamels.

With the compositions of the present invention, such as Examples 7 and 8 above, on the initial bake at 250° F., we have been able to obtain repeatedly Sward hardnesses of 32. On the retouch work with the baking being conducted at 180° F., there have been obtained repeatedly Sward hardnesses of the order of 16. Not only have compositions been provided which meet the desired requirements of the trade, but the added unexpected advantage is secured in that stability of the Sward hardness is maintained.

While some stability of Sward hardness is obtained with the so-called "super enamels," these compositions generally require a catalyst for curing at "touch-up" baking schedules. Baking at 250° F. with the so-called "super enamels" gives a Sward hardness of 30. At 180° F. for the touch-up bake, a hardness of 4 is average. The use of the ordinary catalysts means that the composition has a limited "pot life" and such catalyzed compositions are desirably avoided.

Mono-2-ethyl hexyl di-acid orthophosphate may be used to aid curing at sub-standard baking schedules, with the vehicles of the present invention. From 2.5% to 10% by weight, based on the amino resin solids, of such alkyl acid phosphate curing agents may be used. These agents give "pot-life" of from about 3 weeks to a year or more.

Another unexpected result obtained with the compositions of the present invention is that hardness is achieved while the composition is still relatively warm from the baking operation. In other words, when the workers handle fenders, hoods and the like, emerging from the oven, considerable damage may be done to the first coat and this must be re-touched before the vehicle can be marketed. The compositions of the present invention have extremely high mar resistance developed shortly after emergence from the baking oven as well as very high hardness while hot. The compositions are thermosetting.

With respect to the various basic components of these compositions, the nitrocellulose is preferably present in amounts ranging from about 3% to about 7%. From 7% up to 10% may be used where sub-standard baking conditions are encountered. At about 180° F., it is believed that the nitrocellulose serves to catalyze the melamine resin and develop its hardness at a much more rapid rate. If 10% nitrocellulose is exceeded, there is a much lower initial gloss obtained. 95–100 Gardner (60° Head) is the usual initial gloss rating of these compositions when formulated in accordance with the teachings hereof. If amounts of nitrocellulose up to 50% are employed, then the coating must be rubbed and polished to develop gloss. Rubbing and polishing is not required for the compositions of the present invention. Coating compositions are considered unsatisfactory if they have an initial gloss (Gardner) below 90. Hence, the upper limit of 10% nitrocellulose is critical. At quantities of nitrocellulose less than 3%, flooding of the metallic pigment occurs and at 0% the flooding is at its maximum. Hardness of the composition also begins to drop off. Without any nitrocellulose present and at a 250° F. bake, in addition to "mottling," the gloss is too low.

The melamine-aldehyde, or aminotriazine-aldehyde resin may be used alone, or it may be admixed with up to about 50% of a urea-formaldehyde resin, e.g., butylated dimethylol urea-formaldehyde. These compositions may be alkylated as disclosed in the aforementioned patents. Melamine-formaldehyde, butylated and in a 50–50 mixture of butanol and xylol and commercially available as a 50–60% solids solution is a preferred resin as it seems to yield more fullness of the film. In other words, an appearance of depth of film is secured. It is not too hard a resin and permits the use of shorter alkyds which helps gloss. The combination of nitrocellulose and melamine resin is much superior to melamine resin alone, since the composition is much harder while hot. The melamine resin helps to set the film and prevents the metal from migrating and thus "flooding."

The alkyd resin must be predominantly a non-drying oil modified alkyd, and preferably 100% non-drying oil modified. Up to about 50% by weight of the total modifier of a drying or semi-drying oil modified alkyd may be included, but performance characteristics may be adversely affected. The non-drying oils, their acids, and certain aliphatic unsaturated and saturated acids containing from 8 to 20 carbon atoms may be used for modification of the alkyds. The dibasic acid portion of the alkyd is preferably aromatic, and includes phthalic, isophthalic and terephthalic acids or their anhydrides or mixtures thereof as well as substituted phthalic, iso-phthalic and terephthalic acids. Dibasic aliphatic acids, such as, adipic, azealeic, pimelic, etc. may be used to replace part or all of the preferred aromatic dibasic acid. The aliphatic polyol must contain at least 2 hydroxyl groups and may be selected from such aliphatic polyols containing from 2–8 carbon atoms as ethylene glycol, propylene glycol, diethylene glycol, glyceryl, trimethylolethane, triethanolmethane, trimethylolpropane, pentaerythritol and the like. The alkyds should be "short," as this term is understood in the enamel art, that is from 15–32% modification of the polyester by weight. Relatively minor amounts of drying and semi-drying oil modified alkyds, up to about 10% by weight of the finished enamel may enter the composition through the introduction of pigment concentrates in which the pigment is already ground. So long as the amounts of such drying and semi-drying oil alkyds do not exceed about 10% and they are short, satisfactory results are obtained.

Although the iron pyrophosphate-nonahydrate is a dry powder having a particle size just slightly larger than colloidal, and is ground into these compositions in the same manner as a pigment according to usual enamel practice, it is calculated as a percentage of the vehicle solids and considered such for the purposes of this invention.

These principal ingredients for metallic-containing compositions, e.g., powdered aluminum, dyed aluminum, stainless steel, etc. are carried in suitable solvents generally characterized by a minimum of any ester type solvents. Some ester type solvent is present in the usual nitrocellulose compositions. Other than this, the solvents generally are of the low molecular weight aliphatic ketone type and the aromatic hydrocarbon diluent type.

Conventional pigmentation procedures for enamels of the full color and metallic type can be used. Grinding is effected in a ball mill to a 7H grind on the Hegman scale.

There have been previously mentioned numerous nonessential ingredients such as the petroleum jelly type ingredient for conferring mar-proofness, the plasticizer for improving flexibility, handling, mutual solvation, etc. and a wide variety of low molecular weight enamel and lacquer solvents.

There has been provided, therefore, an improved vehicle for baking enamels for finishing metal surfaces. It is composed essentially of a very low proportion of nitrocellulose and a mixture of an aminotriazine-aldehyde resin, and a non-drying oil modified alkyd in which the modification does not exceed 15–32% by weight. This composition is useful in both metallics and non-metallics. With the metallics, better results are secured if there is additionally included from 2–8% by weight of the vehicle solids of ferric pyrophosphate.

Other compositions formulated in accordance with this invention are reduced with the aforementioned reducer to sprayable consistency and applied to a surface which has been treated with the usual primer surfacer commonly employed in the art on a substrate of bondarized sheet steel. The baking operation after application of the first coat is carried out at 250° F. in the usual case. Higher or lower temperatures may be employed. A second color may be applied over the first and the treatment repeated for multi-tone effects.

We claim:
1. A composition of matter comprising a homogeneous solution having the following general composition:

| | Percent by weight |
|---|---|
| Nitrocellulose | 3 to 7 |
| Amino triazine aldehyde resin | 20 to 35 |
| A non-drying oil modified aliphatic polyol phthalate resin in which said polyol contains from 2 to 6 hydroxyl group and from 2 to 8 carbon atoms | 43 to 75 |
| Ferric pyrophosphate nonahydrate | 2 to 8 |

2. A composition of matter comprising:

| | Parts |
|---|---|
| Nitrocellulose | 5 |
| Di-octyl phthalate | 5 |
| Petroleum jelly | 2 |
| Ferric pyrophosphate nonahydrate | 5 |
| Butylated melamine formaldehyde resin | 23.2 |
| Coconut oil modified glyceryl phthalate resin | 59.8 |

(All parts by weight and calculated as 100° solids.)

3. A composition of matter having the following ingredients in the relative proportions indicated:

| | Lbs. |
|---|---|
| Coconut oil modified glyceryl phthalate (60% solids in xylene-high flash naphtha 1:1) | 179 |
| Cottonseed trimethylolethane phthalate 24% oil by weight (55% solids in xylenemethylisobutyl ketone—6:1) | 137.2 |
| Butylated melamine-formaldehyde resin (60% solids in butanol-xylene—1:1) | 109.1 |
| Methyl isobutyl ketone | 68.5 |
| Ethyl amyl ketone | 16 |
| Methyl ethyl ketone | 15 |
| Di-octyl phthalate | 9 |
| ½″ nitrocellulose solution (30% solids) | 48.2 |
| Petroleum jelly in xylene (10% solids) | 51.5 |
| Ferric pyrophosphate nonahydrate | 13.6 |

4. A composition of matter comprising a homogeneous solution of from 3 to 10 parts by weight of nitrocellulose and 100 parts by weight of a mixture of (a) from about 20% to about 35% by weight of an amino triazine-aldehyde resin and (b) the balance of 100% being a non-drying oil modified alkyd resin in which the dibasic acid is selected from the group consisting of phthalic acid, isophthalic acid and terephthalic acid, and the polyhydric alcohol is an aliphatic polyol containing from 2 to 6 hydroxyl groups and from 2 to 8 carbon atoms, and from 2 to 8 parts by weight per 100 parts of components (a) and (b) of ferric pyrophosphate nonahydrate.

References Cited in the file of this patent

UNITED STATES PATENTS

| | | |
|---|---|---|
| 2,218,474 | Moore | Oct. 15, 1940 |
| 2,553,682 | Scholz et al. | May 22, 1951 |
| 2,718,476 | Eichorn | Sept. 20, 1955 |

FOREIGN PATENTS

| | | |
|---|---|---|
| 711,543 | Great Britain | July 7, 1954 |
| 711,545 | Great Britain | July 7, 1954 |